United States Patent [19]

Lavorel

[11] Patent Number: 4,914,996
[45] Date of Patent: Apr. 10, 1990

[54] PRESSING TOOL FOR STAMPING APPARATUS

[75] Inventor: Gerard Lavorel, Pringy, France

[73] Assignee: Atelier de Decoupage Emboutissage et Mecanique de La Vallee de L'Arve ADEMVA, Thyes, France

[21] Appl. No.: 293,137

[22] Filed: Jan. 3, 1989

[30] Foreign Application Priority Data

Jan. 4, 1988 [FR] France .................................. 88 00221

[51] Int. Cl.⁴ .......................... B26D 7/18; B26D 1/06; B21D 28/02

[52] U.S. Cl. ......................................... 83/151; 83/152; 83/388; 83/620; 83/682; 72/336; 72/337; 72/405

[58] Field of Search ................................ 72/335–337, 72/339, 405, 421; 83/620, 682, 277, 151–153, 386, 388, 100

[56] References Cited

U.S. PATENT DOCUMENTS

| 796,906 | 8/1905 | Gardner | 83/682 |
|---|---|---|---|
| 1,309,157 | 7/1919 | Stockman | 83/681 |
| 2,012,423 | 7/1935 | Ferris. | |
| 3,969,918 | 7/1976 | Sernotus et al. | 72/337 |
| 4,166,372 | 9/1979 | Knight | 72/421 |
| 4,404,837 | 9/1983 | Allen et al. | 72/405 |
| 4,750,348 | 6/1988 | Hennah | 72/405 |

FOREIGN PATENT DOCUMENTS

| 2412260 | 3/1974 | Fed. Rep. of Germany. | |
|---|---|---|---|
| 9730 | 1/1987 | Japan | 72/405 |

Primary Examiner—Daniel C. Crane
Attorney, Agent, or Firm—Emch, Schaffer, Schaub & Porcello Co.

[57] ABSTRACT

A pressing tool including means for cutting a blank from a strip fed longitudinally into the tool. The cutting means comprise a stationary lower punch carried by a press table and a vertically mobile upper die normally located above the punch and intended to be moved in the direction of this punch by the mobile press slide. Means are provided for cutting the end scrap from the strip, these means comprising shears having a stationary blade and a mobile blade, a device for transfer of a cut blank, prestamped blank, or stamped blank, from the station which the blank occupies to the following station, and means to lift each cut blank to the level of the transfer device. The stationary blade is carried by the support of the punch while the mobile blade is carried by the die.

3 Claims, 3 Drawing Sheets

PRESSING TOOL FOR STAMPING APPARATUS

FIELD OF THE INVENTION

This invention relates to a pressing tool able to equip a stamping apparatus.

BACKGROUND OF THE INVENTION

In the technique of mass stamping of metal pieces, two large families of stamping devices are now known:

devices called "following tools" for which the metal strips itself supports the stamped products made in this strip. In these devices, feeding of the metal strip is performed along the axis of the machine, and it is called longitudinal feeding. These devices use a traditional press, on which the following tools are mounted;

"transfer presses" in which the metal pieces to be processed are first totally detached from the metal strip which feeds the machine, and transferred from one stamping station to the next in this machine by means of transfer rods which are totally integrated in this machine. On these devices, feeding by the metal strip is necessarily crosswise, if only because evacuation of the scraps at the moment of cutting the pieces from the strip obviously cannot be performed in the axis of the machine, but rather perpendicular to this axis.

Use of a transfer press is essential for the performance of certain stamping works, which it is impossible to perform by a standard press equipped with following tools.

The transfer presses have the drawback of being relatively complex and consequently of rather high cost relative to presses with following tools. Further, the necessity of feeding each press crosswise is very disadvantageous for installation in shops, since it is necessary to provide sufficient space there to allow this crosswise feeding. Finally, these presses are unique, and of course specific for the stamping work with automatic transfer from one station to the next: they cannot be suitable for work with following tools, which are often preferred because they are more profitable and more economic, or other press works.

A press with longitudinal feeding is known from U.S. Pat. No. 3,969,918. This press is of the type comprising means for cutting, from a longitudinally fed strip, a blank to be stamped, these cutting means consisting of a stationary lower punch carried by the press table and a vertically movable upper die, normally located above the punch and intended to be moved in the direction of the punch by a mobile press slide, means for cutting off the end scrap from the strip consisting of shears exhibiting a stationary blade and a mobile blade, a device for transfer of a cut, prestamped or stamped blank, from the station it occupies to the next station and means to lift each cut blank to the level of the transfer device.

In this press, the means for cutting the blanks and those for cutting the scraps are separate and independent of one another.

Further, the device for transfer of the blanks is placed at a level located just above the upper face of the punch and, consequently, below the high rest position of the die. Consequently, after having cut a blank, during its descending travel, the die must be lifted above this blank which, so that its edges will not be deformed during the ascending travel of the die, should be kept perfecting applied, by its peripheral edge, against the punch, which increases the wear of the cutting edges of the die and especially complicates its shape since it must comprise an annular inside pusher of the same outside perimeter as the punch, a pusher inside which means for lifting the blanks should circulate.

Finally, in this press, the die, the annular pusher and the means for lifting the blanks constitute an independent subassembly of the punch which is intended to be fastened to a mobile press slide while the mobile blade of the shears constituting the means for cutting the scrap is carried by a spring-mounted strap and carried by the lower base plate of the tool.

It can easily be seen that not only is this tool necessarily very complex, but, further, any change in the shape of the blank requires long, costly operations of disassembly of the old tool and assembly and adjustment of the new one.

SUMMARY OF THE INVENTION

The present invention aims at remedying all these drawbacks. For this purpose, it relates to a pressing tool for a stamping apparatus of the type in which the stationary blade is carried by the punch support, while the mobile support is carried by the die.

This arrangement considerably simplifies the production of this tool, since the stationary and mobile blades of the shears are one piece, respectively, with the punch and die, and therefore do not require the presence of an additional slide.

According to another advantageous characteristic of the invention, the device for transferring the cut blanks is located at a level higher than that of the means for cutting the blanks, i.e., than that of the die in high rest position.

This arrangement offers the advantage of allowing a considerable simplification of the tool since the die need not be lifted above the blank that has just been cut before it is lifted to the level of the transfer device. Therefore, it is not useful to provide a pusher for holding the blank against the punch during lifting of the die and the wear of the cutting edge of the die is therefore reduced.

According to a particular embodiment of the invention, the punch is carried by a base plate intended to be fastened to the press table and supporting the stationary blade of the shears for cutting scraps, spring pushers which surround the punch and intended to function as extractors, and at least two vertical columns intended to support and guide the die, with which the mobile blade of the shears is one piece, in its vertical movements, columns with which are associated spring means normally assuring holding of the die in the high rest position, means for lifting the blanks consisting of a pneumatic or magnetic suction device, carried telescopically by the die to be moved downward, i.e., in the direction of the punch, with sufficient offset to reach the blank only after it has been cut by the die and so that, in high rest position, this suction device is located at the level of the transfer device, i.e., above the die.

Thus, this tool forms a subassembly that is easy to mount on the press table and to dismount from it—without having to proceed to long and expensive adjustments since this subassembly can be preadjusted and even adjusted before being mounted on the press. This same subassembly can further be separated from the rest of the tool represented and be used with another tool using the same blank to obtain another stamping installation using the same blank at the start.

According to another characteristic of the invention, the device for transferring each blank from one station to the next essentially comprises two transfer rods driven in a longitudinal back-and-forth movement synchronized with that of the press slide by a connecting rod-crank system, each rod supporting a series of clamps jointed and placed so that each of them corresponds with a clamp of the other rod to form a pair of clamps, each rod further being mounted mobile crosswise on end supports provided with crosswise holes and being constantly thrust by spring means in the direction of the other, while pushers with separation ramps, carried by the base plate fastened to the press slide, cause their separation and release of the blanks at each descent of the slide, the rods then occupying their extreme left end position.

BRIEF DESCRIPTION OF THE DRAWINGS

In any case, the invention will be better understood and its advantages and other characteristics will come out during the following description of a nonlimiting example of embodiment of this pressing tool, with reference to the accompanying diagrammatic drawing in which.

DETAILED DESCRIPTION OF THE INVENTION

Figure 1:
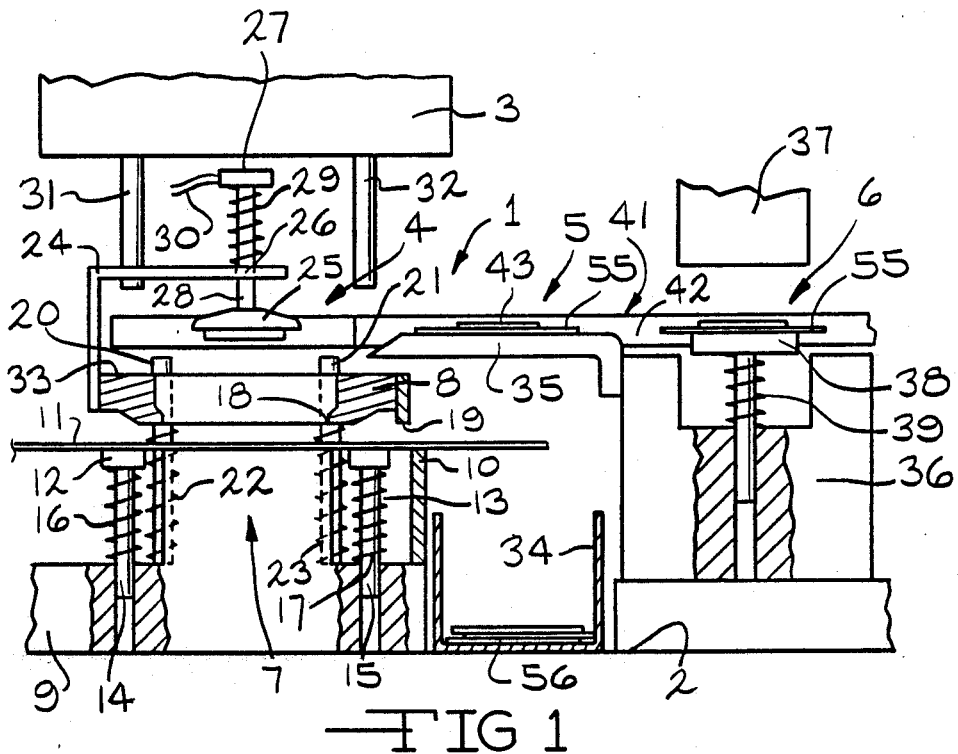
FIG. 1 is a longitudinal view, with partial section, of this tool mounted on the press, a metal strip being fed axially and the press slide being in high position.
Figure 5:
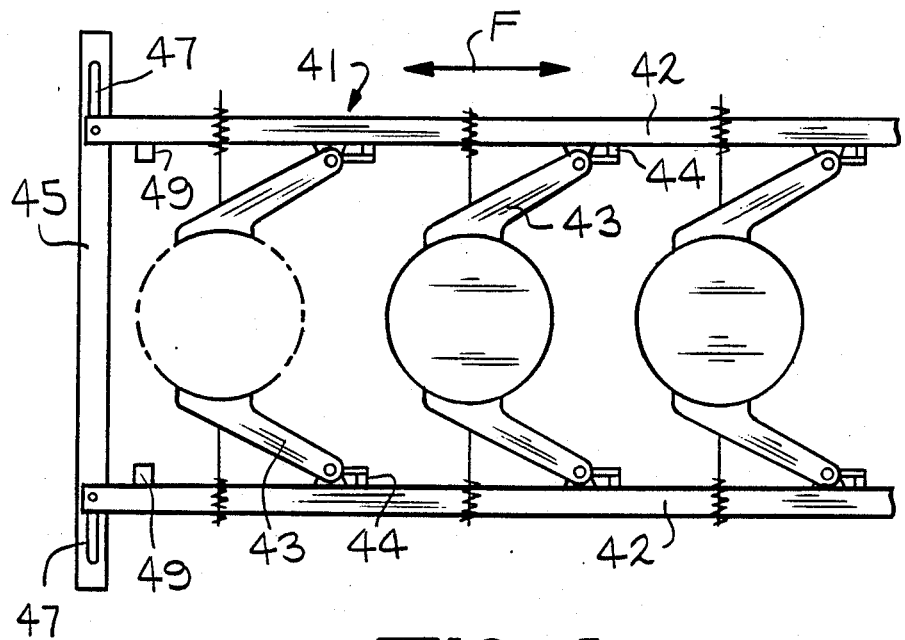
FIG. 5 is a simplified plan view of the device with transfer rods.
Figure 6:
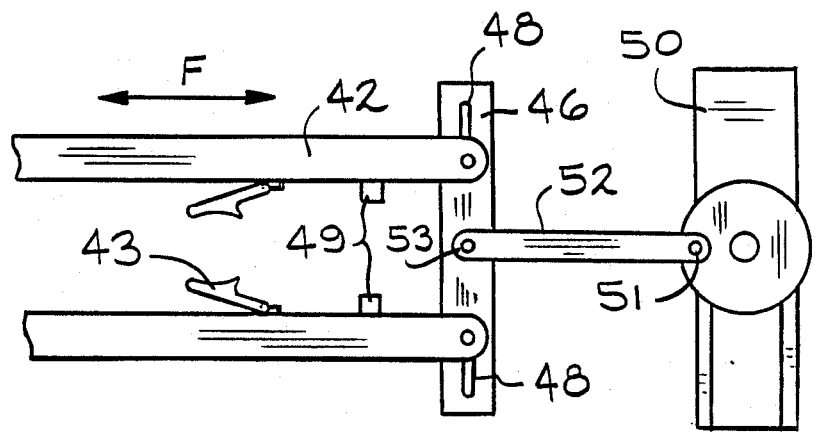
FIG. 6 is a simplified plan view of the system for driving these transfer rods.

Referring first to FIGS. 1, 5 and 6, this tool 1 is able to be mounted on standard press which includes table 2, which is stationary, and the slide (not represented), which is vertically mobile and to which an upper base plate 3 is fastened.

FIG. 1 shows three first stations of the machine which are successively:

a station 4 for cutting the blank to be stamped and the end scrap of the strip, a waiting station 5 in which the cut blank is made to wait and the scrap is collected, a first stamping stamp 6.

First station 4 essentially comprises a punch 7, which is usually fastened to press table 2, and a cutting die 8.

A punch 7, whose periphery is identical with that of the metal blank to be cut, is carried by a lower base plate 9 fastened to press table 2. This base plate 9 also carries stationary blade 10 of shears whose role will be detailed below and whose length is greater than the width of metal strip 11 with which the machine is fed. This strip 11 is supported, on the one hand, by punch 7 and, on the other hand, a crown 12 which is itself supported by two vertical push rods 13 which are mounted to slide in two hollow vertical wells 14, 15 in lower base plate 9 to act as their guide, these rods being thrust upward by two helical springs 16, 17.

Die 8, whose cutting edge 18 is shaped to the periphery of punch 7, laterally carries a mobile blade 19 which, with said stationary blade 10 constitutes the shears intended for cutting the end scraps from strip 11.

This die is mounted to slide in the vertical direction on two small vertical guide columns 20 and 21, which therefore go through it in the vertical direction and which are carried by base plate 9 of punch 7. It is thrust upward by two helical spring 22, 23 which rest on base plate 9 and surround small columns 20 and 21.

Die 8 supports, with a bracket arm 24, a pneumatic suction device 25 which is coaxial with its cylindrical cutting edge 18. This suction device 25 is mounted as a telescope, in the vertical direction, on arm 24: it goes through it at 26 and the upper end or broadened head 27 of its vertical support rod 28 is thrust upward by a helical spring 29 which surrounds it. Suction device 25 is connected to a suction source by a hose 30.

Upper base plate 3, which is fastened to the press slide, comprises two small vertical thrust columns 31, 32, which are placed, on both sides of suction device 25, at right angles with upper face 33 of the solid part of die 8.

Second station 5 comprises simply a receptacle 34, which is intended to receive scraps 56 from the end of strip 11, and a removal table 35, which overhangs box 34 and is fastened, with projection, to the left side of stationary die 36 which equips following station 6, which is the first stamping station.

This entirely standard stamping station comprises a die 36 fastened to table 2, a punch 37 fastened to the base plate of the slide, and a small table 38, mounted to slide axially in die 36 and thrust upward by a helical spring 39, this small table having the role of supporting blank 55 to be stamped, and supporting it after stamping.

The pressing tool also comprises a device 41 for transfer of blank and stamped products from one station to the next, a device that essentially comprises transfer rods 42, driven in a longitudinal back-and-forth movement as indicated by double arrow F, and clamps 43. This transfer device 41, which does not differ notably from those that are normally integrated in transfer presses, is represented in a few more details in FIGS. 5 and 6 showing the upstream end of this transfer device and of FIG. 6 showing the downstream end.

Transfer rods 42, in a very standard way, carry clamps 43 whose rotation, in the closing direction, is limited by stops 44. These rods 42 are held, at their two ends, by crosspieces 45, 46, these ends being able to slide crosswise in elongated holes 47, 48 made in crosspieces 45 and 46: so that rods 42 are free to move away from one another when ramp pushers 49, carried by base plate 3 of the slide, tend, in a well-known way, to cause this separation during descent of the press slide. When raps 49 are lifted, the slide being in the high position, rods 42 are brought to their closest position, represented in FIGS. 5 and 6, by return springs (not shown).

Transfer rods 42 make a longitudinal back-and-forth movement according to arrow F. The control device for this movement can be seen in FIG. 6, this device being completely new. It comprises a rotary cylinder 50 which, in a way known in the art, transforms the crosswise alternating linear movement of its rod, forming a rack, into a movement of alternating rotation of its gear. The latter makes a crank pin 51 turn to which is jointed, by one of its ends, a crank 52 whose other end 53 is jointed to the middle of crosswise rod 46. This device imparts to transfer rods 42 a longitudinal movement at a sinusoidal movement speed.

The operation of tool 1 will now be described with reference to FIGS. 1 to 4.

Figure 2:
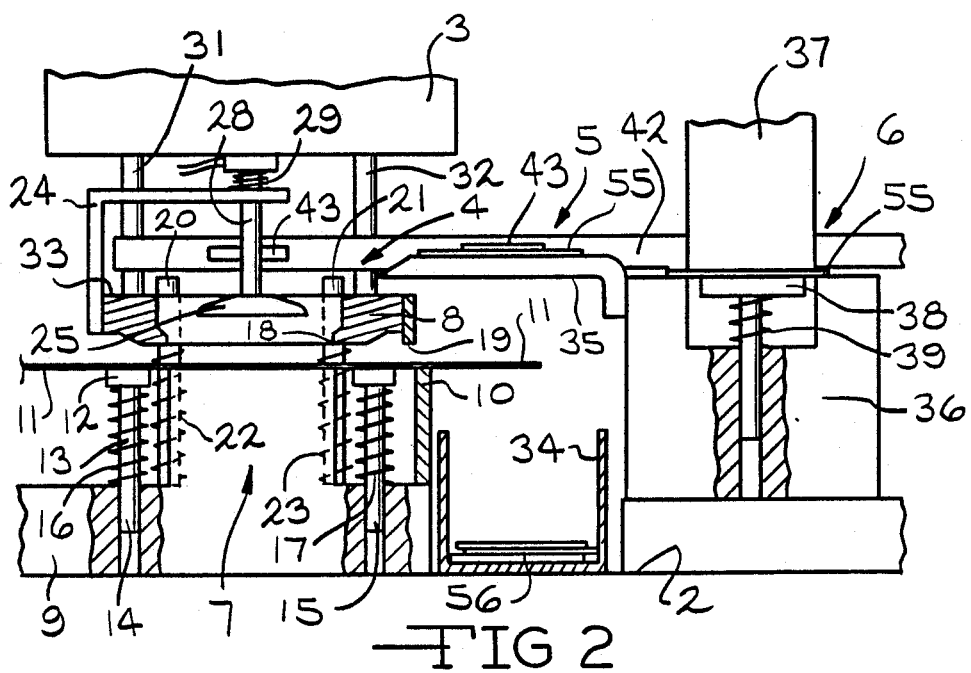
FIG. 2 is a view similar to FIG. 1, the slide having started its descent.

Metal strip 11 is fed in the longitudinal direction. In the starting position of the cycle (FIG. 1), upper base plate 3 of the slide is in high position (high dead center) and strip 11 rests on punch 7 and on the extraction crown 12. Transfer rods 42 are offset toward the right and their clamps 43 tightly lock a blank 55, placed, waiting, on small table 35 of waiting station 5, another prestamped blank 55', placed on small table 38 of first stamping station 6, and so on for the pieces waiting at the following stamping stations. FIG. 2 represents the start of the descent phase of the press slide. The ramps carried by base plate 3 of the slide have separated transfer rods 42, and therefore clamps 43, while base plate 3, after coming to rest on head 27, has made suction device 25 descend relative to arm 24 by compressing spring 29. Small columns 31, 32, having come to rest on surface 33 of die 8, therefore begin to thrust it downward.

Figure 3:
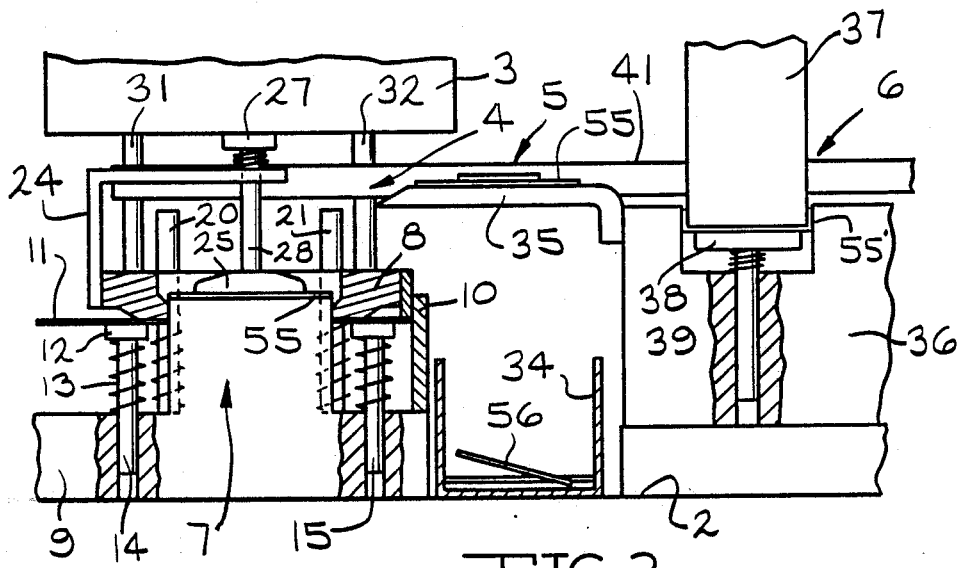
FIG. 3 shows the same result obtained when the slide has reached the low position.

The slide continuing its descent, die 8 then descends with it, so that die 8 and punch 7, on the one hand, and blades 10 and 19 of the shears, on the other hand, cut from strip 11, by punching and shearing action, respectively, a blank 55, which remains on punch 7, and an end scrap from strip 56, which falls into receptacle 34 (see FIG. 3). Simultaneously, thrust by upper base plate 3 and strip 11, rods 13 are sunk into their respective wells 14 and 15.

The position represented in FIG. 3 is that reached when the slide has arrived at its low dead center; at this moment, suction device 25, which has come to rest on blank 55, is then connected to the suction source, which causes firm holding of this blank 55 against it. Of course, stamping, at station 6, of another blank 55' is performed at the same time and in a standard way during the concomitant descent of punch 37.

Figure 4:
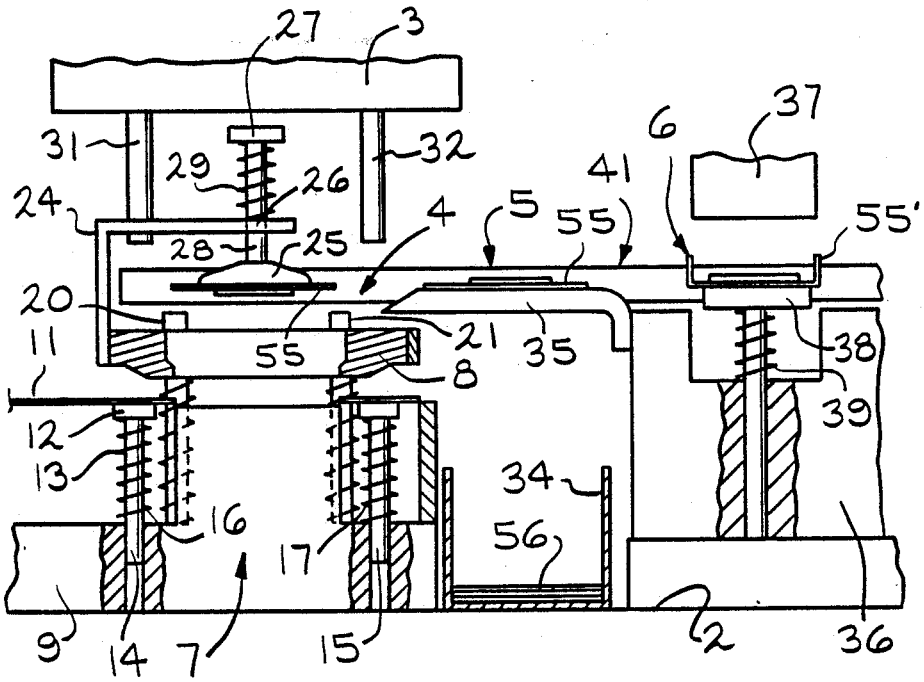
FIG. 4 shows the position of this same device when the slide has then come back to the high position.

The partial vacuum being maintained in suction device 25, the slide rises, as well as strip 11 thrust by rods 13, die 8 thrust by springs 22 and 23, and suction device 25 thrust by spring 29 and which therefore lifts blank 55 to being it horizontal to transfer rods 42, which then close on blanks 55 and 55', because of the rising of the slide and therefore of ramps 49: FIG. 4 represents the waiting position reached when base plate 3 of the slide has come back to its high dead center. At this moment, transfer rods 42 are offset to the right because of the movement of crank pin 51; which moves from a station all blanks 55, 55' carried by clamps 43, so that there is a return to the position of FIG. 1, except with the difference that each blank 55 has taken the place of the preceding one. Strip 11, of course, has advanced a sufficient length to take is position relative to FIG. 1.

Of course, the invention is not limited to the embodiment that has just been described. Rather, it takes in all equivalent embodiments. For example, to optimize the use of the die, the tool can be provided to cut blanks in alternate rows.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A pressing tool for a stamping apparatus comprising:
    means for cutting a blank from a strip fed longitudinally through said tool, said blank cutting means including a stationary lower punch carried by a press table and a mobile upper die located above said lower punch, said mobile upper die adapted and constructed to be moved in the direction of said lower punch by a mobile press slide;
    means for cutting end scrap from such strip, said end scrap cutting means including shears having a stationary blade engaged with and supported by said lower punch and press table and a mobile blade engaged with and carried by said upper die and press slide;
    means for transferring a blank from a first station to a second station positioned above said mobile upper die; and,
    means for lifting each cut blank to said transfer means; wherein said blank cutting means and said end scrap cutting means both operate during movement of said mobile press slide toward said press table and said lifting means operates to place a cut blank into said transfer means during movement of said mobile press slide away from said press table.

2. The pressing tool according to claim 1 wherein said lower punch is carried by said support fastened to said press table and said supporting stationary blade;
    pushers with springs surround said lower punch, said pushers adapted and constructed to support said strip;
    at least two vertical columns adapted and constructed to support and guide said die;
    said mobile blade being in one piece with said die in its vertical movements;
    columns having associated therewith means with springs adapted and constructed to hold said die in a high rest position;
    means for lifting blanks, said means comprising a pneumatic or magnetic suction device;
    said suction device carried telescopically by said die and adapted and constructed so as to be moved downwardly with sufficient offset so as to reach the blank only after said blank has been cut by said die;
    said suction device being located at the level of the transfer device.

3. The pressing tool according to claim 1 wherein said transfer device for each blank from one station to the next station comprises two transfer rods driven by a longitudinal back-and-forth movement, said movement synchronized with movement of said press slide;
    a connecting rod-crank system for synchronizing the longitudinal back-and-forth movement of said transfer device with said press slide;
    each of said rods supporting a series of jointed clamps located so that each clamp corresponds with a clamp of a rod opposite said rod to form a pair of clamps;
    each rod further being mounted mobile crosswise on end supports provided with crosswise holes;
    spring means adapted and constructed to thrust said rods in the direction of the other;
    separation ramps carried by said base plate being fastened to said press slide;
    said separation ramps adapted and constructed to cause separation of said rods and release said blanks at each descent of said slide.

* * * * *